United States Patent [19]

Osawa

[11] Patent Number: 6,039,588
[45] Date of Patent: Mar. 21, 2000

[54] ROTARY CONNECTOR

[75] Inventor: Toshio Osawa, Ikoma, Japan

[73] Assignee: Matsushita Electric Industrial Co., Ltd., Osaka, Japan

[21] Appl. No.: 09/114,351

[22] Filed: Jul. 13, 1998

[30] Foreign Application Priority Data

Jul. 11, 1997 [JP] Japan .................................. 9-186341

[51] Int. Cl.⁷ .................................................. H01R 35/04
[52] U.S. Cl. ............................................ 439/164; 439/15
[58] Field of Search ....................................... 439/164, 15

[56] References Cited

U.S. PATENT DOCUMENTS

| | | | |
|---|---|---|---|
| 5,242,309 | 9/1993 | Hasegawa | 439/15 |
| 5,310,356 | 5/1994 | Obata et al. | 439/164 |
| 5,348,481 | 9/1994 | Ortiz | 439/25 |
| 5,669,777 | 9/1997 | Matsumoto et al. | 439/164 |
| 5,692,915 | 12/1997 | Ishikawa et al. | 439/15 |
| 5,772,146 | 6/1998 | Kawamoto et al. | 439/164 |
| 5,800,190 | 9/1998 | Ichiwawa et al. | 439/164 |
| 5,813,875 | 9/1998 | Ishikawa et al. | 439/164 |

FOREIGN PATENT DOCUMENTS 4-310445  11/1992  Japan .

Primary Examiner—Gary F. Paumen
Attorney, Agent, or Firm—Ratner & Prestia

[57] ABSTRACT

Comprising an outside case, an inside case installed rotatably in the outside case, a cable installed in a space formed by the outside case and the inside case, and a guide ring, the guide ring is accommodated in the space so as to abut against elastically. With the frictional resistance between the guide ring and inside case being greater than the frictional resistance of the guide ring and outside case, the guide ring rotates and moves. In this constitution, generation of noise is extremely reduced. Hence, an inexpensive and highly reliable rotary connector is obtained. In particular, this rotary connector is used in a steering device of automobile or the like.

20 Claims, 5 Drawing Sheets

ROTARY CONNECTOR

TECHNICAL FIELD OF THE INVENTION

The present invention relates to a rotary connector used in, for example, a steering device of an automobile or the like, for electrically connecting an outside case and a relatively rotatable inside case.

BACKGROUND OF THE INVENTION

Hitherto, this kind of rotary connector has been used as electrical connecting means between a movable element and a stationary element of a steering device of an automobile or the like. In this rotary connector, the rate of flat cable in the total cost is high, and it is attempted to lower the cost by shortening the required length of flat cable. Such prior art is proposed in Japanese Laid-open Patent No. 4-310445.

FIG. 9 is a top sectional view showing a schematic structure of the rotary connector disclosed in this patent publication. As shown in FIG. 9, an inside case is rotatably fitted in an outside case 1, and a flexible flat cable 4 is accommodated in a ring-shaped space 3 formed between the outside case 1 and inside case 2. Ends 4A, 4B of the flat cable 4 are respectively fixed to the outside case 1 and inside case 2, and are connected to an external electric circuit. The flat cable 4 is accommodated in the space 3 as being wound in a reverse direction on the inner side of the outer tube of the outside case 1 and on the outer side of the inner tube of the inside case 2, and the inverted position of this winding direction is the U-shaped inverted portion 4C. In this space 3, moreover, a plurality of rollers 6 coupled along the peripheral direction by a coupling member 5 are disposed, and the inverted portion 4C of the flat cable 4 is guided to be inverted along roller 6A.

In thus constituted rotary connector, when the inside case 2 is rotated in the counterclockwise direction, the inverted portion 4C of the flat cable 4, and the rollers 7 coupled to the coupling member 5 also move in the peripheral direction of the space 3, and the winding state of the flat cable 4 is a rewound state, being wound more on the inner side of the outside case 1. When the inside case 2 is rotated in the clockwise direction, the inverted portion 4C of the flat cable 4, and the rollers 6 coupled to the coupling member 5 also move in the same direction, and the winding state of the flat cable 4 is a tightened state, being wound more on the outer side of the inner tube of the inside case 2.

In such conventional rotary connector, however, in order to control the move of the flexible flat cable 4 in the peripheral direction, a slight clearance is provided between the plurality of rollers 6 coupled by the coupling member 5 and the coupling member 5 in order to allow the rollers 6 to rotate. Moreover, since the rollers 6 are large in mass, due to vibration from outside or automobile or the like, collision sound between the coupling member 5 including the rollers 6 and the inside case 2 or outside case 1, and collision sound due to clearance between the rollers 6 and coupling member 5 were caused, which were heard as noise inside the automobile.

It is hence an object of the invention to solve such problems of the prior art, and present a highly reliable rotary connector reduced in noise level at low cost.

SUMMARY OF THE INVENTION

A rotary connector of the invention comprises an outside case, a rotatable inside case, and a guide ring accommodated in a space formed between the outside case and the inside case, in which the guide ring is accommodated in the outside case and inside case by elastically abutting, and the guide ring rotates and moves while a first frictional resistance between the guide ring and the inside case is larger than a second frictional resistance between the guide ring and the outside case.

In this constitution, plurality of rollers for smoothly winding the cable are not needed. Noise is notably reduced. Hence a highly reliable rotary connector is obtained at low cost.

Figure 1:
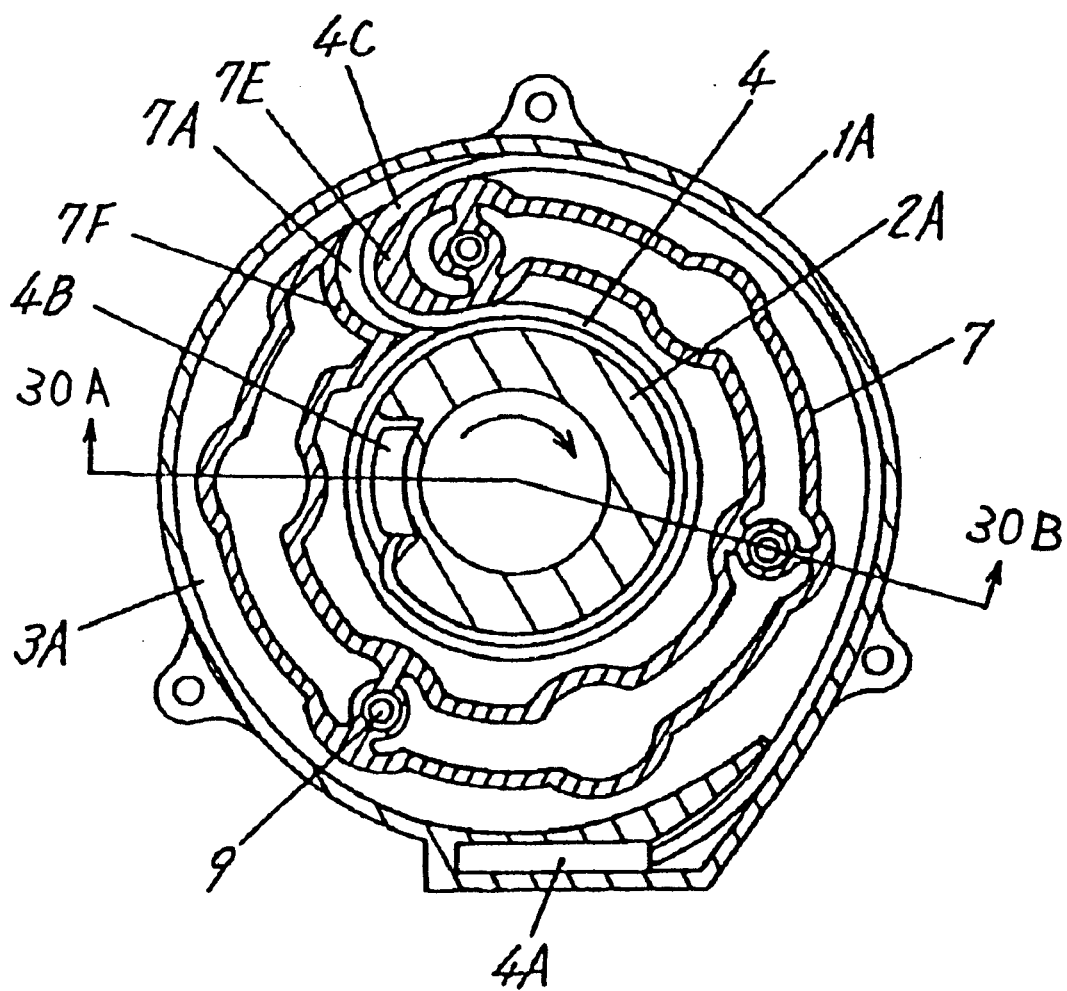
FIG. 1 is a top sectional view showing essential parts of a rotary connector according to a first embodiment of the invention.

| Reference Numerals | |
|---|---|
| 1A | Outside case |
| 1B | Inner bottom |
| 2A | Inside case |
| 2B | Inner tube |
| 2C | Lid |
| 3A | Space |
| 4 | Flat cable |
| 4A | Outside end |
| 4B | Inside end |
| 4C | Inverted portion |
| 7 | Guide ring |
| 7A | Notch |
| 7B | Bump |
| 7C | Hole |
| 7D | Sliding surface |
| 7E | Inner wall |
| 7F | Outer wall |
| 7G | Leaf spring |
| 7H | Groove |
| 7J | Protrusion |
| 8 | Coil spring |
| 9 | Metal ball |
| 10 | Rotary member |
| 30A, 30B | Cut-off line |

DETAILED DESCRIPTION OF THE INVENTION

The rotary connector of the invention comprises:
(a) an outside case,
(b) an inside case rotatably installed in the outside case,
(c) a cable installed in a space formed between the outside case and the inside case, (d) a guide ring movably installed in the space formed between the outside case and the inside case, and (e) first frictional resistance means installed between the guide ring and the inside case, and second frictional resistance means installed between the guide ring and the outside case.

A first end of the cable is connected to the outside case, a second end of the cable is connected to the inside case, and the first resistance means has the larger frictional resistance than the second resistance means. When the inside case is rotated, the cable is wound along the periphery of the inside case, and the guide ring moves in the space along with winding of the cable.

Preferably, the cable has an inverted portion, the cable is wound within the space, and the inverted portion of the cable is inverted through the notch in the guide ring.

Preferably, the outside case has a cylindrical inner side.

Preferably, the inside case has a cylindrical outer side.

Preferably, the cable has an inverted portion, and the inverted portion has a U-shape Preferably, the cable has a flat shape.

Preferably, the cable has a flexibility.

Preferably, the first end and the second end of the cable are electrically connected to an external electrical circuit.

In this constitution, since plurality of rollers are not needed, the manufacturing cost if lowered. Still more, since rollers are not used, collision sound or noise due to collision of rollers are not generated. By the use of the guide ring, the cable can be wound smoothly, and generation of noise is notably suppressed. Being free from moving rollers, the product life is extended. Thus, the rotary connector having low noise, high reliability and low manufacturing cost is obtained.

Preferably, the first frictional resistance means has a bump installed on the upper side of the guide ring, and a lid installed in the upper side direction of the guide ring of the inside case so as to contact with the bump, and the second frictional resistance means has a bottom of the outside case, and a ball being thrust by a spring installed on the lower side of the guide ring so as to abut elastically against the bottom.

In this constitution, the ball being thrust by the spring elastically abuts against the inner bottom of the outside case, and the guide ring is accommodated between the inside case and outside case by abutting elastically, so that collision sound between the guide ring and inside case or outside case can be suppressed.

Preferably, the first frictional resistance means has a spring installed on the upper side of the guide ring, and a lid installed in the upper side direction of the guide ring of the inside case so as to contact with the spring, and the second frictional resistance means has a bottom of the outside case, and a rotary member installed on the lower side of the guide ring so as to abut against the bottom.

In this constitution, by rotation of the rotary member, abrasion of the guide ring and outside case can be notably decreased, and the flat cable can be wound smoothly, and noise is significantly lowered.

Preferably, the first frictional resistance means has a spring installed on the upper side of the guide ring, and a lid installed in the upper side direction of the guide ring of the inside case so as to contact with the spring, and the second frictional resistance means has a bottom of the outside case, and a protrusion installed on the lower side of the guide ring, at a central side position from the spring installed on the upper side, so as to abut against the bottom.

In this constitution, since the protrusion abutting against the outside case is provided at the inner tube side of the inside case from the spring, without adding new parts, the guide ring can be rotated and moved in a state of a lager frictional resistance with the inside case than with the outside case, so that the cable can be wound smoothly in an inexpensive constitution.

Preferably, the guide ring is made of resin.

Preferably, the spring is formed integrally with the guide ring main body made of resin.

In this constitution, while curtailing the number of parts being used, the assembling work of the rotary connector can be simplified, and the manufacturing cost is extremely lowered.

Referring now to FIG. 1 to FIG. 8, preferred embodiments of the invention are described below. Same parts as explained in the prior art are identified with same reference numerals, and their detailed description is omitted.

Exemplary Embodiment 1

Figure 2:
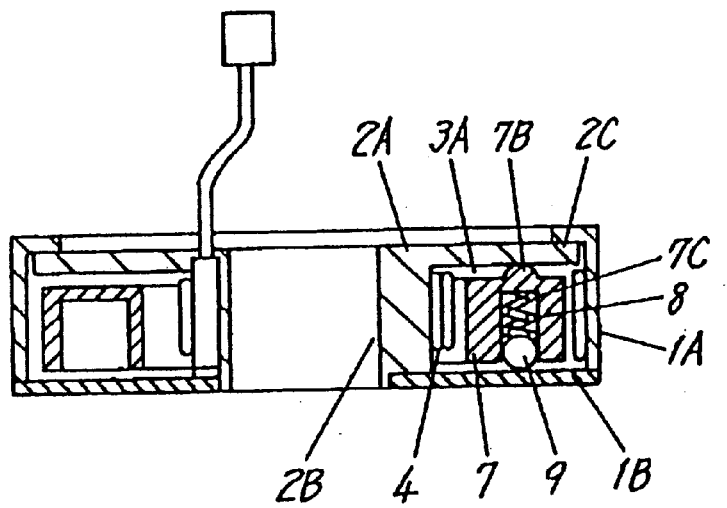
FIG. 2 is a front sectional view of the rotary connector shown in FIG. 1.

FIG. 1 is a top sectional view showing essential parts of a rotary connector according to a first embodiment of the invention, and FIG. 2 is a front sectional view showing a section along line 30A–30B in FIG. 1.

In FIG. 1 and FIG. 2, an inside case 2A having an inner tube 2B is rotatably accommodated in a cylindrical outside case 1A. A flexible flat cable 4 is accommodated in a ring-shaped space 3A formed between the outer tube inner side of the outside case 1A and inner tube 2B of the inside case 2A. An outside end 4A of this flat cable 4 is fixed to the outer tube of the outside case 1A, and an inside end 4B is fixed to the inner tube of the inside case 2A. The both ends of the flat cable 4 are connected to an external electrical circuit. Moreover, the flat cable 4 is accommodated in the space 3A as being wound in a reverse direction on the outer tube inner side of the outside case 1A and on the inner tub outer side of the inside case 2A, and the inverted position of this winding direction is a U-shaped inverted portion 4C. Further, in the space 3A formed between the inner bottom 1A of the outside case 1A and the lid 2C of the inside case 2A, a resin-made guide ring 7 having a notch 7A for passing the inverted portion 4C of the flat cable 4 is accommodated.

Figure 3:
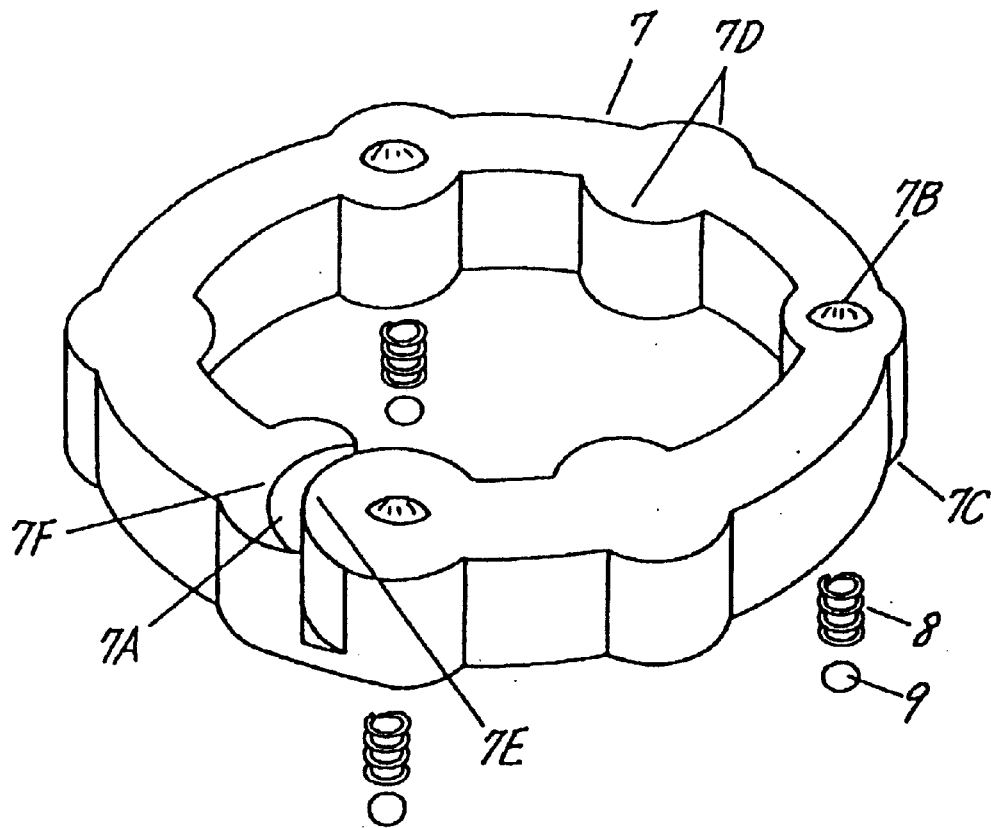
FIG. 3 is a perspective view of a guide ring composed in the rotary connector shown in FIG. 1.

A perspective view of the guide ring 7 is shown in FIG. 3. On the upper side of the guide ring 7, hemispherical bumps 7B abutting against the lower side of the lid 2C of the inside case 2A are provided at three positions. In a hole 7C in the lower side of the guide ring 7, a coil spring 8 and a metal ball 9 are accommodated. The metal ball 9 is thrust by the coil spring 8, and elastically abuts against the inner bottom 1B of the outside case 1A. On the inside surface and outside surface of the guide ring 7, an arc-shaped sliding surface 7D for sliding smoothly by defining the winding of the flat cable 4 is provided.

The operation of this rotary connector is described below while referring to FIG. 1 to FIG. 4. First, as shown in FIG. 1, when the inside case 2A is rotated in the clockwise direction, since the flat cable 4 is wound to the outer side of the inner tube 2B of the inside case 2A, the inverted portion 4C of the flat cable 4 presses the inner wall 7E of the notch 7A of the guide ring 7, and by this force the guide ring 7 rotates in the same direction as the inside case 2A, and the flat cable 4 is in tightened state as being wound more at the outer side of the inner tube 2B of the inside case 2A.

Figure 4:
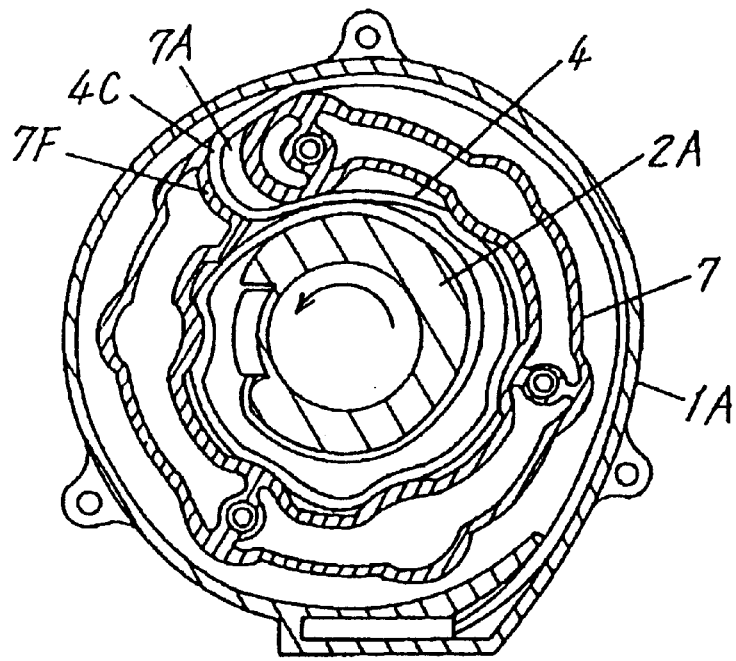
FIG. 4 is a top sectional view showing the operation of the rotary connector shown in FIG. 1.

Or, as shown in FIG. 4, when the inside case 2A is rotated reversely in the counterclockwise direction, the flat cable 4 departing from the outer side of the inner tube 2B of the inside case 2A presses the inner side of the guide ring 7, and the inverted portion 4C presses the outer wall 7F of the notch 7A of the guide ring 7.

At this time, a small frictional resistance acts on the lower side of the guide ring 7 having the metal ball 9 thrust by the coil spring 8 elastically abutting against the inner bottom 1B of the outside case 1A, whereas a large friction acts on the upper side of the guide ring 7 pressing the hemispherical bump 7B pressing to the lower side of the lid 2C of the inside case 2A. Accordingly, along with the ration of the inside case 2A, the guide ring 7 rotates in the same direction, and the wound state of the cable 4 is in a rewound state being much wound to the inner side of the outer tube of the outside case 1A.

Thus, according to the embodiment, the bump 7B abutting against the lower side of the lid 2C of the inside case 2A is formed on the upper side of the guide ring 7, and the metal ball 9 elastically abutting against the inner bottom 1B being thrust by the coil spring 8 is accommodated in the lower side. In this constitution, in the state of the frictional resistance greater with the inside case 2A than with the outside case 1A, the guide ring 7 rotates along with rotation of the inside case 2A. As a result, the flat cable 4 can be wound smoothly.

Moreover, by the metal ball 9 being thrust by the coil spring 8 and the bump 7B at the upper side, the guide ring elastically abuts and is accommodated between the inner bottom 1B of the outside case 1A and the lower side of the lid 2C of the inside case 2A. Accordingly, when this rotary connector is used in an automotive part, collision sound of the guide ring 7 with the outside case 1A or inside case 2A generated by vibration of automobile or the like can be extremely suppressed.

Exemplary Embodiment 2

Figure 5:
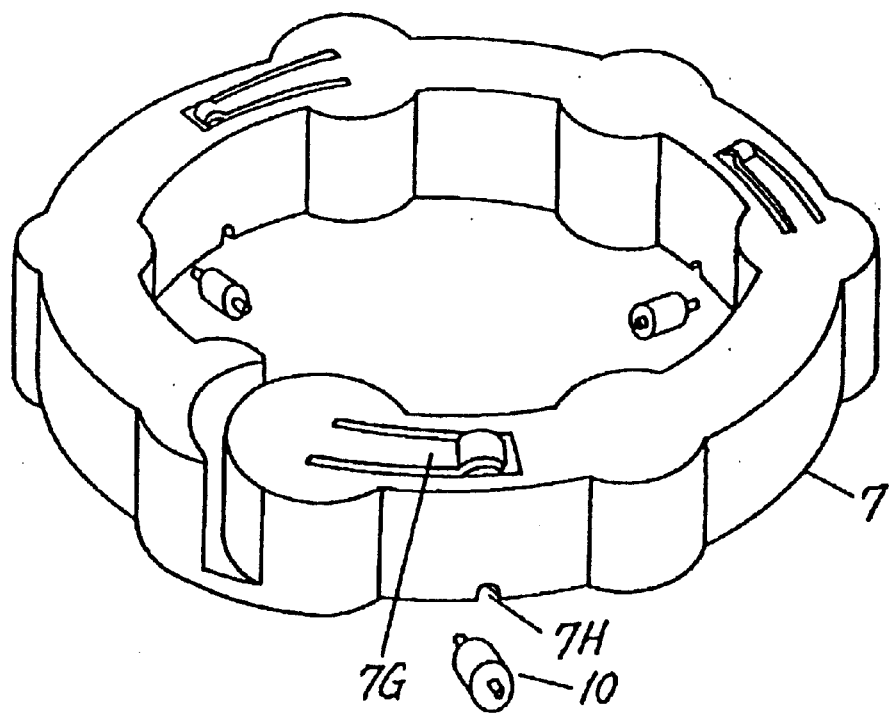
FIG. 5 is a perspective view of a guide ring of a rotary connector according to a second embodiment of the invention.
Figure 6:
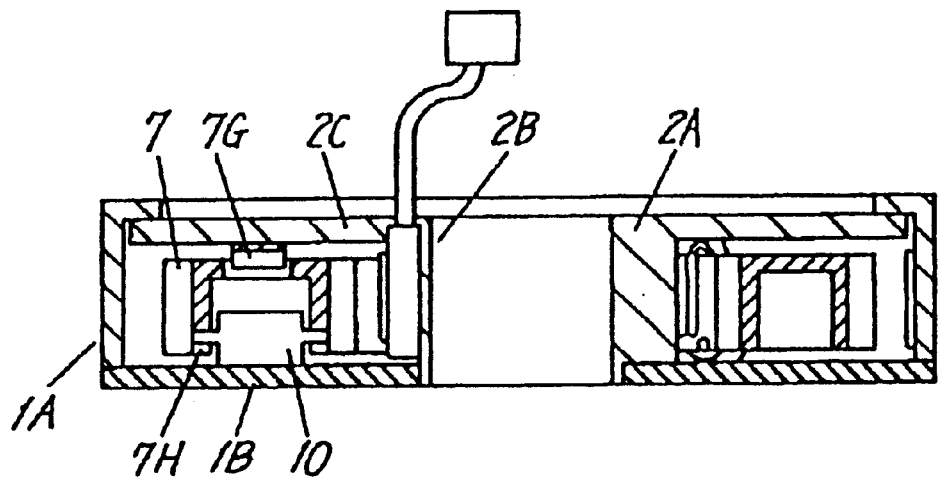
FIG. 6 is a front sectional view of the rotary connector in the second embodiment of the invention.

FIG. 5 is a perspective view of a guide ring of a rotary connector according to a second embodiment of the invention, and FIG. 6 is a front sectional view of the rotary connector in this embodiment. In FIG. 5 and FIG. 6, a leaf spring 7G formed integrally with the main body of guide ring 7 is provided on the upper side of a resin-made guide ring 7. A groove 7H is formed at the lower side of the guide ring 7, and a rotary member 10 is rotatably supported in this groove 7H. A small roller is used as the rotary member 10. The leaf spring 7G elastically abuts against the lower side of the lid 2C of the inside case 2A, and the rotary member 10 abuts against the inner bottom 1B of the outside case 1A.

In this constitution, when the inside case 2A is rotated, in comparison of torque between the coefficient of friction between the guide ring 7 and outside case 1A, and the frictional resistance between the guide ring 7 and inside case 2A, as compared with the torque due to frictional resistance between the guide ring 7 and the outside case 1A side having the rotary member 10 of the guide ring 7 rotatably abutting against the inner bottom 1B, the torque due to frictional resistance between the guide ring 7 and the inside case 2A side having the leaf spring 7G elastically abutting against the lower side of the lid 2C is greater by far. As a result, the guide ring 7 rotates along with rotation of the inside case 2A, and the flat cable 4 is wound.

Thus, according to the embodiment, by rotation of the rotary member 10, the torque due to frictional resistance between the guide ring 7 and outside case 1A can be extremely lowered. Hence, the guide ring 7 rotates securely along with rotation of the inside case 2A, so that the flat cable 4 can be wound smoothly, thereby notably suppressing generation of sound.

Exemplary Embodiment 3

Figure 7:
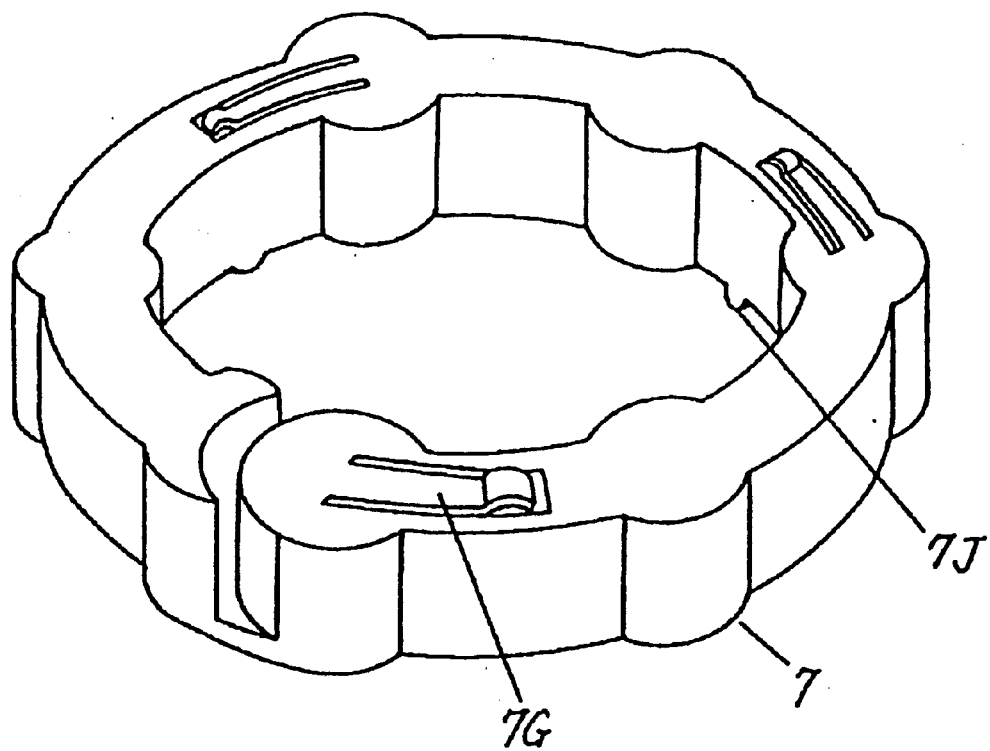
FIG. 7 is a perspective view of a guide ring of a rotary connector according to a third embodiment of the invention.
Figure 8:
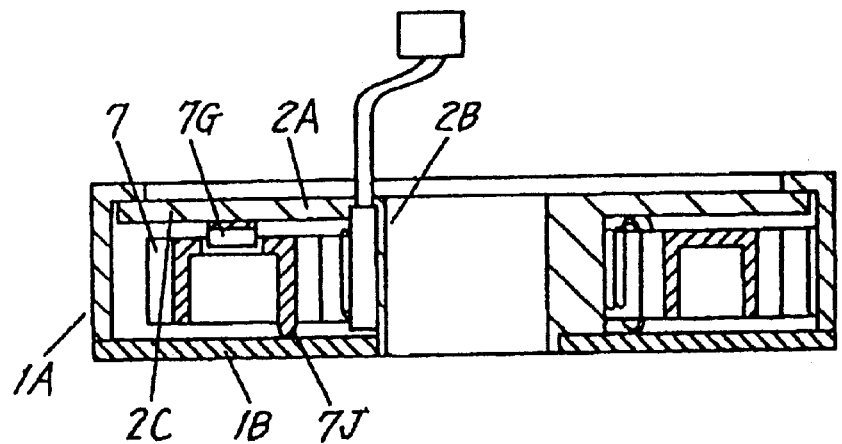
FIG. 8 is a front sectional view of the rotary connector in the third embodiment of the invention.
Figure 9:
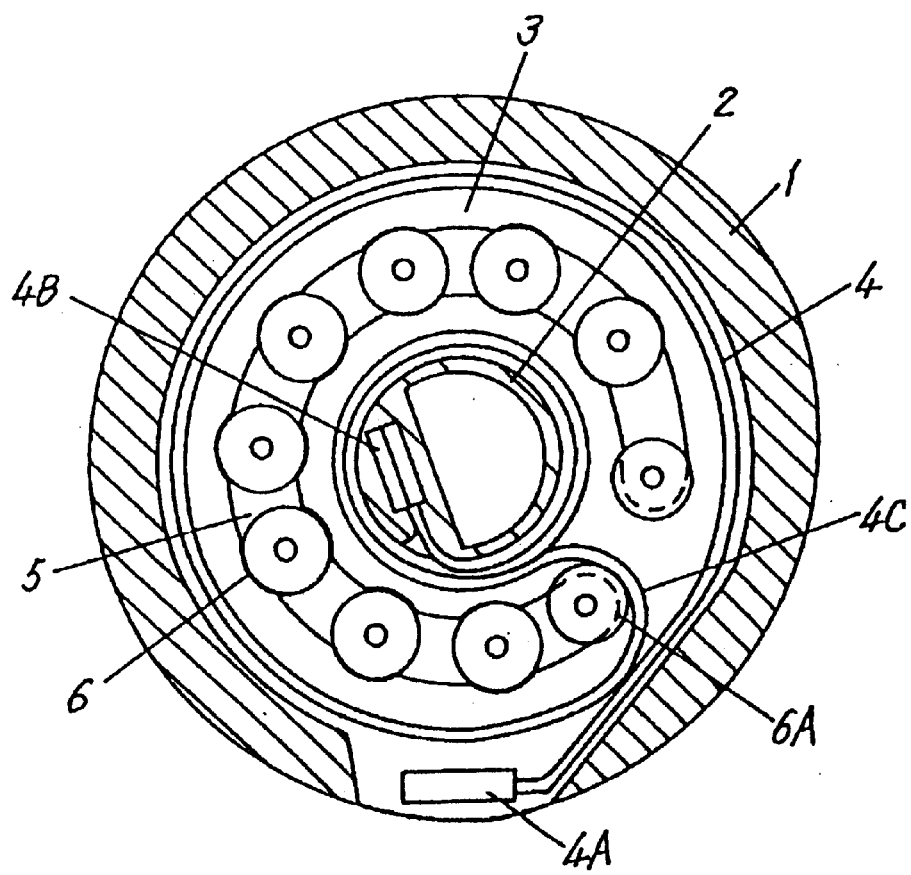
FIG. 9 is a top sectional view showing a schematic structure of a conventional rotary connector.

FIG. 7 is a perspective view of a guide ring of a rotary connector according to a third embodiment of the invention, and FIG. 8 is a front sectional view of the rotary connector in the same embodiment. In FIG. 7 and FIG. 8, a leaf spring 7G is formed integrally with the guide ring 7 main body on the upper side of the resin-made guide ring 7. At the lower side of the guide ring 7, a protrusion 7J is provided at the position of the inner tube 2B side of the inside case 2 from the position of the leaf spring 7G disposed on the upper side, and this protrusion 7J abuts against the inner bottom 1B of the outside case 1A. That is, the guide ring 7 has the leaf spring 7G disposed at the upper side and the protrusion 7J disposed at the lower side, and the protrusion 7J is disposed at the central side than the leaf spring 7G.

In this constitution, when the inside case 2A is rotated, in the comparison of torque between the frictional resistance between the guide ring 7 and outside case 1A and the frictional resistance between the guide ring 7 and inside case 2A, the torque due to frictional resistance between the leaf spring 7G disposed on the upper side of the guide ring 7 and the lid 2C of the inside case 2A is greater than the torque due to the frictional resistance between the protrusion 7J disposed on the lower side of the guide ring and the outside case 1A. Accordingly, the guide ring 7 rotates along with the inside case 2A, and the flat cable 4 is wound.

Thus, according to the embodiment, only by the guide ring 7 forming the leaf spring 7G integrally on the upper side, smooth winding of the flat cable 4 is achieved. Hence, the number of parts is curtailed, the assembling work of the rotary connector is simplified, and an inexpensive connector can be obtained.

According to the invention, therefore, since plurality of rollers are not necessary, the manufacturing cost is lowered. Since rollers are not used, noise such as collision sound due to collision of rollers is not generated. By the use of the guide ring, the cable can be wound smoothly, so that generation of noise is notably suppressed. Moreover, the guide ring and cable can be moved at high precision. Since movable rollers are not used, the product life can be enhanced. Thus, the rotary connector of low noise, high reliability, and low manufacturing cost is obtained. In particular, the above effects are especially excellent when the rotary connector of the invention is used in a device accompanied by vibration such as steering device of automobile.

What is claimed is:

1. A rotary connector comprising:
   (a) a cylindrical outside case,
   (b) an inside case having an inner tube, rotatably installed in said outside case,
   (c) a wound flat cable installed in a space formed between said outside case and said inside case,
       said wound flat cable being flexible,
       a first end of said wound flat cable being connected to said outside case, and further connected to an electric circuit,
       a second end of said wound flat cable being connected to said inside case, and further connected to said electric circuit, and
       said wound flat cable having a U-shaped inverted portion, and
   (d) a guide ring having a notch, movably installed in the space formed between the outside case and the inside case,
       wherein said inverted portion of said wound cable is inverted through said notch of said guide ring,
       said guide ring contacts to said inside case and said outside case, a first frictional resistance between said guide ring and said inside case being greater than a second frictional resistance between said guide ring and said outside case, and when said inside case is rotated, said guide ring moves by said first frictional resistance.

2. A rotary connector of claim 1, said outside case has a bottom, said inside case has a lid installed in the upper side direction of said guide ring, a bump abutting against the lower side of said lid of said inside case is installed on the upper side of said guide ring, and a ball being thrust by a coil spring is installed at the lower side of said guide ring so as to abut elastically against said bottom of said outside case, wherein said first frictional resistance between said bump installed on said upper side of said guide ring and said lid of said inside case is greater than said second frictional resistance between said ball installed at said lower side of said guide ring and said bottom of said outside case.

3. A rotary connector of claim 1, said outside case has a bottom, said inside case has a lid installed in the upper side direction of said guide ring, a leaf spring elastically abutting against the lower side of said lid of said inside case is installed on the upper side of said guide ring, and a rotary member abutting against said bottom of said outside case is installed on the lower side of said guide ring, wherein said first frictional resistance between said leaf spring installed on said upper side of said guide ring and said lid of said inside case is greater than said second frictional resistance between said rotary member installed at said lower side of said guide ring and said bottom of said outside case.

4. A rotary connector of claim 3, wherein said leaf spring is formed integrally with said guide ring, and said guide ring and said leaf spring are made of resin.

5. A rotary connector of claim 1, said outside case has a bottom, said inside case has a lid installed in the upper side direction of said guide ring, a leaf spring elastically abutting against the lower side of said lid of said inside case is installed on the upper side of said guide ring, and a protrusion abutting against said bottom of said outside case is installed on the lower side of said guide ring, at a central side from the leaf spring installed on said upper side, wherein said first frictional resistance between said leaf spring installed on said upper side of said guide ring and said lid of said inside case is greater than said second frictional resistance between said protrusion installed at said lower side of said guide ring and said bottom of said outside case.

6. A rotary connector of claim 5, wherein said leaf spring is formed integrally with said guide ring, and said guide ring and said leaf spring are made of resin.

7. A rotary connector comprising:

(a) an outside case, (b) an inside case rotatably installed in said outside case, (c) a cable installed in a space formed between said outside case and said inside case, a first end of said cable being connected to said outside case, and a second end of said cable being connected to said inside case, (d) a guide ring movably installed in said space formed between said outside case and said inside case, and (e) first frictional resistance means installed between said guide ring and said inside case, and second frictional resistance means installed between said guide ring and said outside case, wherein a first frictional resistance of said first frictional resistance means is greater than a second frictional resistance of said second frictional resistance means, when said inside case is rotated, said cable is wound along the periphery of said inside case, and said guide ring moves within said space along with winding of said cable by said first frictional resistance means.

8. A rotary connector of claim 7, wherein said cable has an inverted portion, said guide ring has a notch, said cable is wound within said space, and said inverted portion of said cable is inverted through said notch in said guide ring.

9. A rotary connector of claim 7, wherein said outside case has a cylindrical inner side.

10. A rotary connector of claim 7, wherein said inside case has a cylindrical outer side.

11. A rotary connector of claim 7, wherein said cable has an inverted portion, and said inverted portion has a U-shape.

12. A rotary connector of claim 7, wherein said cable has a flat shape.

13. A rotary connector of claim 7, wherein said cable has a flexibility.

14. A rotary connector of claim 7, wherein said first end and said second end of said cable are electrically connected to an external electrical circuit.

15. A rotary connector of claim 7, wherein said first frictional resistance means has a bump installed on the upper side of said guide ring and a lid installed in the upper side direction of said guide ring of said inside case so as to contact with said bump, and said second frictional resistance means has a bottom of said outside case and a ball being thrust by a spring installed on the lower side of said guide ring so as to abut elastically against said bottom.

16. A rotary connector of claim 7, wherein said first frictional resistance means has a spring installed on the upper side of said guide ring and a lid installed in the upper side direction of said guide ring of said inside case so as to contact with said spring, and said second frictional resistance means has a bottom of said outside case and a rotary member installed on the lower side of said guide ring so as to abut against said bottom.

17. A rotary connector of claim 7, wherein said first frictional resistance means has a spring installed on the upper side of said guide ring and a lid installed in the upper side direction of said guide ring of said inside case so as to contact with said spring, and said second frictional resistance means has a bottom of said outside case and a protrusion installed on the lower side of said guide ring, at a central side position from the spring installed on the upper side, so as to abut against said bottom.

18. A rotary connector of claim 7, wherein said guide ring is made of resin.

19. A rotary connector of claim 7, wherein said first frictional resistance means has a spring installed on the upper side of said guide ring and a lid installed in the upper side direction of said guide ring of said inside case so as to contact with said spring, and said guide ring and said spring are integrally formed of resin.

20. A rotary connector of claim 7 which is used in a steering device of an automobile.

* * * * *